June 13, 1950     E. W. KAISER     2,511,343
PREFABRICATED PIPING SYSTEM

Filed Nov. 22, 1943     2 Sheets-Sheet 1

INVENTOR.
Edward W. Kaiser
BY Walter F. Boye

June 13, 1950     E. W. KAISER     2,511,343
PREFABRICATED PIPING SYSTEM

Filed Nov. 22, 1943     2 Sheets-Sheet 2

INVENTOR.
Edward W. Kaiser
BY
Walter F. Boye

Patented June 13, 1950

2,511,343

UNITED STATES PATENT OFFICE 2,511,343

PREFABRICATED PIPING SYSTEM

Edward W. Kaiser, Chicago, Ill.

Application November 22, 1943, Serial No. 511,367

3 Claims. (Cl. 138—63)

This invention relates generally to improvements in prefabricated piping systems, and more particularly to piping systems having a liner of relatively little inherent rigidity, such as lead. It has for an object, to provide a conduit and joint fitting therefor, especially advantageous for conducting or flowing corrosive liquids therethrough and preventing deterioration of the utilized conduits and joint fittings by acid attack thereupon to such an extent as to render the same prematurely unfit or safe for continued efficient usage.

It is also an object of the invention to provide a piping system which, by reason of its construction and the arrangement of its constructional instrumentalities, can be successfully prefabricated or assembled and thereafter moved to a place or point of installation without liability of damage thereto, as for example, fracturing of the system conduits and/or the joint fittings provided thereto; hence effecting a material saving of time and labor and incident costs.

Yet another object of the invention is to provide a conduit so constructed as to prevent its external "sweating" when employed to conduct therethrough liquids of lower than atmospheric temperatures, the same being particularly advantageous when installed in areas exposed or subjected to the fumes of corrosive chemicals, which fumes, with the forming of condensation upon the external surfaces of conduits, will attack and rapidly deteriorate the metal constituting the same and render them prematurely unfit for use.

The invention also aims to provide a conduit construction capable of successfully withstanding heavy loads, such as may be imposed thereupon when installed under roadways, railway tracks, etc.; and to withstand internal pressure and high temperature by means of protection afforded the liner by a casing.

Moreover, it is an object of the invention to provide a conduit installation or system utilizing a novel form of joint fitting for interconnecting the adjacent ends of the conduits, the same being so constructed as to facilitate rapid, simple and efficient connection or installation, and also, to permit convenient and rapid internal inspection thereof, repairs, replacements and the like, of the conduits connected thereby, without the necessity of completely disconnecting the fitting from such conduits and so, incurring those inefficiencies and losses otherwise incident to such work and procedure.

In order that the invention and its mode of operation may be readily understood by those skilled in the art to which it appertains, I have in the accompanying drawings and the detailed description based thereupon, set out one embodiment of my invention.

Having more particular reference to the drawings, in connection with which like characters of reference will designate corresponding parts throughout, the invention may be stated to comprise casings or housings, generally indicated by the numeral 1, of predetermined or desirable lengths, adapted to be interconnected in desired and directive assembled relation by means of joint fittings 2, 3 and 4. The joint fittings 2, 3 and 4, as will be noted upon reference to Figure 1 of the accompanying drawings, may be, and preferably are, of those general designs commonly used in the art, i. e., T joints or fittings, 45° elbow joints or fittings and 90° elbow joints or fittings, or other known and accepted types, respectively; moreover, it will, of course, be understood and appreciated that the hereinabove joints or fittings may be of other general designs, such as may be well known in the art.

Figure 1:
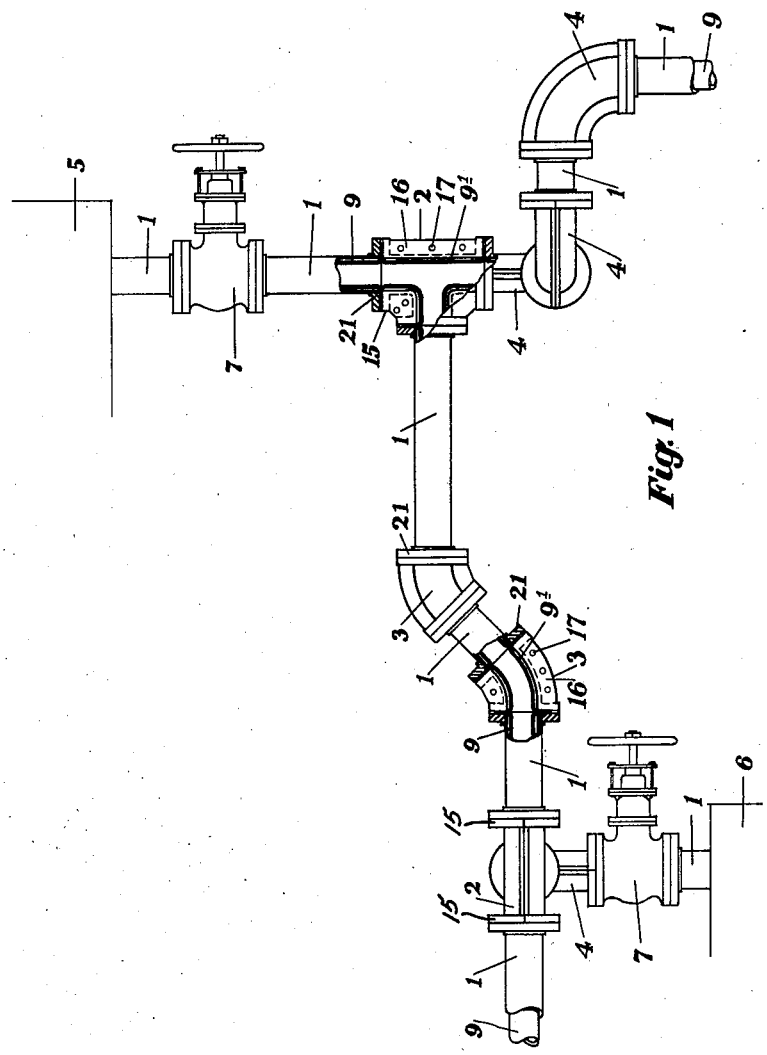
Figure 1 is a semi-schematic view, with a part broken away and shown in section, illustrating my improved piping system.

As is usual in piping installations, suitable connection or connections are made between the lined pipe systems and the source of supply or receiving apparatuses. One such embodiment is illustrated by Figure 1 of the accompanying drawings, wherein certain of the lined pipe systems are connected to and communicate with receiving or supplying means, schematically shown and designated by the numerals 5 and 6, respectively. Such connections, of course, may be controlled by the interpositioning of suitable valves 7 in these particular pipe systems, for reasons which will be well understood by workers skilled in the art. Other arrangements or dispositions of pipe systems comprehending my improved system, manifestly, may be effected to comply with and effectually serve existing conditions or requirements.

Each of the lined pipe systems which, as hereinabove stated, are in required lengths, comprise casings or housings of suitable gauge metal, the opposite ends of which are externally screw threaded or welded. Continuous one piece tubular liners, such as designated by the numeral 9, are received in and extend through each of said casings or housings, and as will be noted upon reference to Figure 3 of the drawings, have their outer or opposite ends extended for distances beyond the corresponding ends thereof, for a purpose which will be subsequently described. Each tubular liner 9 is preferably constructed or formed of a suitable corrosion resistant material, such as lead, alloys, rubber, plastics, etc., and its diameter is less than the internal diameter of the receiving casing or housing 1, not only to permit the reception thereof within said casing or housing, but additionally, to effect a spacing of its outer walls or sides from the inner walls or sides of said casing. Thus, it will be seen that an uninterrupted annular space is provided between the liner 9 and its receiving casing or housing 1 throughout their respective lengths.

The liner 9, formed of material sufficiently thick or resistant to withstand any required working pressure, is entirely coated about its circumference and throughout its length with a suitable plastic adhesive material 10, of required depth or thickness. Over and about this plastic adhesive covering or coating 10, a wrapping or covering of heat insulating and shock absorbing material 11 is arranged, while a second and outer plastic adhesive coating or covering 12 is applied to or engaged over and about the outer surface of the heat insulating and shock absorbing coating 11, as is well shown in Figures 3 and 4 of the accompanying drawings. The combined thickness of the plastic adhesive coverings 10 and 12 and the heat insulating and shock absorbing covering 11 substantially corresponds to the width or depth of the annular spacing or clearance between the liner 9 and its receiving casing or housing 1 and in consequence, it will be seen that said liner 9 will be provided, throughout its length, with effectual support from the adjacent portions of the casing or housing 1. Moreover, it will be understood and appreciated that the coverings 10, 11 and 12 will impart a material degree of rigidity to the liner. This acts also as a hanger or support for the liner. Under certain circumstances the liner may, however, be used without any felt or wrapping.

In instances where liquids are being flowed or conducted through the liners 9, at temperatures lower than atmospheric, a definite heat insulating efficiency will be accorded such liners and without transmitting lowered temperature to the casing whereby condensation upon its outer surface or walls will be minimized.

The joint fittings 2, 3 and 4, hereinbefore generally identified, are of sectional construction. For purposes of illustration, whereby to facilitate understanding of the invention, I have chosen to herein illustrate, in detail, the T type of joint fitting, identified by the numeral 2. It will, however, be understood that with the exception of basic or general configuration, the construction of the joint fittings 3 and 4 will correspond thereto. Therefore, the following detailed description of the joint fitting 2 will suffice for the remaining types of said joint fittings, except as to their particular design or angularities.

Figure 2:
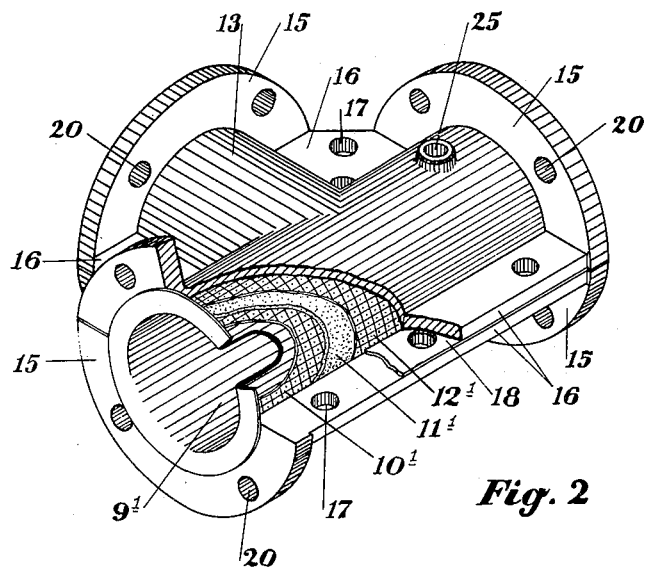
Figure 2 is an enlarged detail in perspective, with parts broken away and shown in section, of a type of T-fitting employed by the system.

The joint fitting 2 consists of a medially and longitudinally divided substantially cylindrical body, including cross-sectional semi-circularly shaped complemental sections 13 and 14, the outer ends of which are formed or otherwise provided with fixedly arranged right angularly disposed semi-circular flanges 15, while the opposite side portions thereof are formed or otherwise provided with fixed right angularly disposed flanges 16. The end flanges 15, as will be noted, constitute substantially circularly shaped bodies or flanges upon assembly of the joint fitting sections 13 and 14. The flanges 16, provided by sides of said sections 13 and 14, are adapted to be arranged in abutting or juxtaposed relation upon assembly of the sections 13 and 14. To facilitate fixed connection between the sections 13 and 14, with assembly of the joint fitting 2, the flanges 16 may be and preferably are formed with complementally arranged bolt receiving openings 17, while to render the jointure between such flanges fluid-tight, I may and preferably do arrange packing strips 18, as clearly shown in Figure 2, therebetween. Connecting bolts 19 are passed through the aligned corresponding openings 17 of the flanges 16 and, obviously, fixedly and positively interconnect the joint fitting sections 13 and 14.

The end flanges 15 of the joint fitting 2 are also preferably formed with spaced connecting bolt receiving openings 20, in order that they, and in consequence, the joint fitting, may be fixedly or positively connected to the adjacent or meeting ends of the casings or housings 1.

A tubular liner $9^1$, corresponding to the previously described tubular liner 9, is provided to and arranged in the joint fitting 2. It will be understood that the liner $9^1$ is formed or otherwise provided with branches corresponding to the branches of said joint fitting 2, whereby the entire internal area of said fitting will be covered or lined thereby. Additionally, it is to be noted that the outer ends of the liner $9^1$ are extended for distances beyond the flanged outer ends 15 of the sections 13 and 14 of the joint fitting 2; also, that those portions of the liner $9^1$ within the joint fitting 2, are provided with plastic adhesive coverings $10^1$ and $12^1$ and a heat insulating and shock absorbing wrapping or covering $11^1$, all of which correspond to the previously described coverings 10, 11 and 12, both as to construction and utility.

Figure 3:
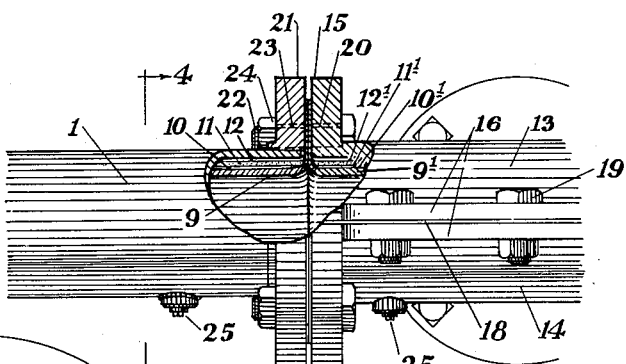
Figure 3 is a fragmentary detail in elevation, with a part broken away and shown in section, showing the manner in which the joint fitting or fittings are connected to abutting or meeting conduit ends.
Figure 4:
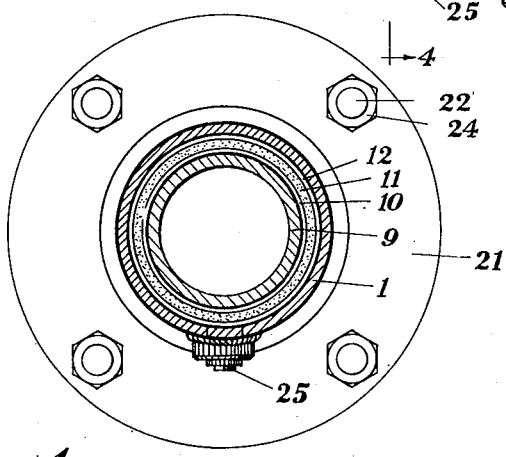
Figure 4 is a transverse section taken on the line 4—4 of Figure 3, looking in the direction in which the arrows point.

In assembling or fabricating a piping system constructed in accordance with my invention, it will be understood that joint fittings 2, 3 or 4, of the required type, are interposed between the adjacent ends of appropriate casings or housings 1. Those ends of said casings or housings meeting or directly adjacent the corresponding ends of the branches of the joint fitting have circularly shaped connecting flanges 21 engaged with and over their screw threaded or welded end portions, whereupon the extended and adjacent end of the liner 9 is flared outwardly in substantially right angular relationship to the body portion thereof, as shown in Figure 3 of the drawings, and flatly engaged with the outer face of the adjacent connecting flange 21. The outer end of the liner $9^1$ extending from the adjacent end of the joint fitting is similarly formed and, as will be noted, lies flatly against a portion of the outer face or side of the sectional end flange provided by the semi-circular flanges 15 on the sections 13 and 14 of said fitting.

Connecting bolts 22 are now passed through the openings 20 of the flanges 15 and through similar openings 23 formed in adjacent portions of the connecting flange 21, and have locking nuts 24, or the like, engaged with their screw threaded extremities. With tightening of the nuts 24 upon their respective bolts 22, connection between the meeting ends of the casing or housing 1 and the joint fitting will be effected, and additionally, the flared or flanged outer end portions of their respective liners 9 and 9¹ will be compressed and will serve as effectual gaskets to insure perfect fluid-tight jointure or connection.

The outwardly or angularly flared extended ends of the liners 9 and 9¹, in addition to functioning as gaskets or packing between the interconnected ends of the casing or housing 1 and the joint fitting, will also serve as an effectual means whereby to positively anchor and retain their particular liners 9 and 9¹ against any possibility of undesired longitudinal movement with respect to their particular receiving bodies.

As hereinbefore stated, the joint fittings 3 and 4 are of sectional construction, corresponding to that of the T type of joint fitting 2. Each of said joint fittings 3 and 4, of course, are equipped with liners such as hereinbefore described and identified by the numeral 9¹, having the plastic adhesive coverings or coatings 10¹ and 12¹ and the intermediately arranged heat insulating and shock absorbing wrappings 11¹ provided thereto. Also, the outer ends of the liners 9¹ within the joint fittings 3 and 4 are extended beyond their respective ends and are adapted to be outwardly or right angularly flared in the manner hereinbefore described, whereby to function as effectual gaskets or packing in subsequently effected connections or jointures. As the liners 9 and 9¹ are expanded a perfect bond is effected with the adhesive coverings.

The construction of my improved piping system is such that the same may be prefabricated in part or in whole and then moved to the particular place or point of installation and thereupon installed, without danger or liability of breakage of either the casings or housings or the joint fittings. Such an expedient as will be understood, will effect a valuable saving of time and labor and of those costs incident thereto. In point with this statement, while certain flexure of the casings or housings 1 and their joint fittings 2, 3 and/or 4 will occur during their moving in prefabricated form, and installation, it is to be understood that such movement will not result in the fracturing or breakage of the casings, housings or joints, primarily due to the overall laminated construction thereof, i. e., the casings or housings 1, the joint fittings 2, 3 and 4, with their respective liners 9 and 9¹ provided with the plastic coverings 10, 10¹, 12 and 12¹, and the intermediate heat insulating and shock absorbing wrappings 11 and 11¹. It will be understood and appreciated by workers skilled in this art that a piping system constructed in accordance with my invention will be entirely and efficiently self-supporting as against heavy loads, shocks or the like, to which the same may be subjected when installed under roadways, railway tracks and like heavy duty installations.

If desired, the exterior surfaces of both the conduits, casings or housings 1 and the sectional joint fittings 2, 3 and 4, may be covered with a suitable corrosion resisting material for protection against external corrosion. Also, should it be so desired, the casings or housings 1 and the fittings 2, 3 and 4, may be formed, at suitable points throughout their respective lengths, with internally screw threaded openings, adapted to be normally closed by suitable screw threaded plugs 25, as is also shown in said Figures 2 and 3, thus permitting suitable testing to determine whether or not any leakage through the liners and their respective coverings into or onto the inner sides of their particular receiving bodies, has occurred.

I claim:

1. A piping system, including a pipe made of expansible and contractible material, a liner of heat expansible material within and extending throughout the length of the pipe in substantially parallel relation thereto, the outside diameter of said liner being less than the inside diameter of said pipe and providing a space between the pipe and the liner, a coating of adhesive bonding material wholly and substantially evenly over and about the outside surface of the liner, a sheathing of resilient heat insulating material over, about and engaged with said adhesive bonding material, and a second coating of adhesive bonding material wholly and substantially evenly over and about the outside surface of said sheathing of resilient heat insulating material and engaged with the inside surface of said pipe, the first and second mentioned coatings and the sheathing bondingly interconnecting said liner to said pipe, whereby to maintain the liner in substantially parallel relation to the pipe during heat expansion of the liner and to effect its return to and retention in said substantially parallel relation when cool.

2. A piping system, including a joint fitting body made of expansible and contractible material divided longitudinally throughout its length to constitute relatively opposed complemental sections, outwardly extending flanges along the longitudinal sides of said sections arranged in juxtaposed relation, means detachably interconnecting said flanges, a liner of heat expansible material within and extending throughout the length of the fitting body in substantially parallel relation thereto, the outside diameter of said liner being less than the inside diameter of said fitting and providing space between the fitting and the liner, a coating of adhesive bonding material wholly and substantially evenly over and about the outside surface of the liner, a sheathing of resilient heat insulating material over, about and engaged with said adhesive bonding material, and a second coating of adhesive bonding material wholly and substantially evenly over and about the outside surface of said sheathing of resilient heat insulating material and engaged with the inside surface of said fitting, the first and second mentioned coatings and the sheathing bondingly interconnecting said liner to said fitting whereby to maintain the liner in substantially parallel relation to the fitting during heat expansion of the liner and to effect its return to and retention in said substantially parallel relation when cool.

3. A piping system, including a plurality of pipes having flanged ends, a joint fitting interconnecting said pipes in endwise relation, said joint fitting being divided longitudinally throughout its length to constitute relatively opposed complemental sections, outwardly extending flanges along the longitudinal sides of said sections arranged in juxtaposed relation, means detachably interconnecting said side flanges, flanges on the opposite ends of said sections, liners of heat expansible material received within and extending throughout the lengths of the pipes and the fitting and for distances beyond the respective ends thereof, the extended ends of said liners being outwardly flanged and engaged between the adjacent end flanges of said pipes and fitting, each of said liners being arranged in substantially parallel relation to their respective pipes and fitting and the outside diameter of each being less than the inside diameter of said pipes and fitting and providing space between the pipes and fitting and liner, a coating of adhesive bonding material wholly and substantially evenly over and about the outside surface of each of the liners, sheathings of resilient heat insulating material over, about and engaged with said adhesive bonding material, and second coatings of adhesive bonding material wholly and substantially evenly over and about the outside surfaces of said sheathings of resilient heat insulating material and engaged with the inside surfaces of said pipes and fitting, the first and second mentioned coatings and the sheathings bondingly interconnecting said liners to said pipes and fitting, whereby to maintain the liners in substantially parallel relation to the pipes and to the fitting during heat expansion of the liners and to effect their return to and retention in said substantially parallel relation when cool.

EDWARD W. KAISER.

REFERENCES CITED

The following references are of record in the file of this patent:

UNITED STATES PATENTS

| Number | Name | Date |
|---|---|---|
| 171,440 | Smith | Dec. 21, 1875 |
| 315,565 | Speer | Apr. 14, 1885 |
| 406,332 | Bayles | July 2, 1889 |
| 483,274 | Walker et al. | Sept. 27, 1892 |
| 494,671 | Dudley-Cooper | Apr. 4, 1893 |
| 504,871 | Forsyth | Sept. 12, 1893 |
| 690,241 | Day | Dec. 31, 1901 |
| 690,744 | Line | Jan. 7, 1902 |
| 714,903 | Hinds | Dec. 2, 1902 |
| 785,176 | Mommertz | Mar. 21, 1905 |
| 794,350 | Feust | July 11, 1905 |
| 903,316 | Reimann | Nov. 10, 1908 |
| 1,004,270 | Jahnke | Sept. 26, 1911 |
| 1,111,688 | Bonitz | Sept. 22, 1914 |
| 1,497,396 | Wry | June 10, 1924 |
| 1,577,495 | Scharwath | Mar. 23, 1926 |
| 1,914,897 | Schade | June 20, 1933 |
| 1,927,105 | Welch | Sept. 19, 1933 |
| 1,948,211 | Fritz | Feb. 20, 1934 |
| 1,949,984 | Walker | Mar. 6, 1934 |
| 1,964,123 | Kaiser | June 26, 1934 |
| 2,094,898 | Lundeen | Oct. 5, 1937 |
| 2,132,574 | Moise | Oct. 11, 1938 |
| 2,158,772 | Beckwith | May 16, 1939 |
| 2,286,623 | Kellaher et al. | June 16, 1942 |
| 2,290,333 | Johnson | July 21, 1942 |

FOREIGN PATENTS

| Number | Country | Date |
|---|---|---|
| 181 | Great Britain | Jan. 4, 1889 |
| 16,359 | Great Britain | Oct. 1, 1898 |
| 17,125 | Great Britain | Sept. 5, 1896 |
| 134,860 | Germany | Oct. 6, 1902 |
| 227,590 | Germany | Oct. 24, 1910 |
| 308,344 | Germany | Oct. 12, 1918 |